United States Patent [19]

Lillibridge et al.

[11] Patent Number: 4,545,846
[45] Date of Patent: Oct. 8, 1985

[54] ENVELOPE GUMBOX FRICTION BRAKE AND SAFETY SLIP CLUTCH

[75] Inventors: Harold R. Lillibridge, Burlingame; Joseph D. Russo, Palo Alto, both of Calif.

[73] Assignee: Champion International Corporation, Stamford, Conn.

[21] Appl. No.: 644,369

[22] Filed: Aug. 27, 1984

[51] Int. Cl.⁴ ............................................. B32B 1/00
[52] U.S. Cl. .................................... 156/578; 118/258
[58] Field of Search .............. 118/258, 259, 261, 262; 156/578

[56] References Cited

U.S. PATENT DOCUMENTS 2,589,966 3/1952 Rullo ............................. 118/262 X
2,839,025 6/1958 Burke et al. ................... 118/262 X

*Primary Examiner*—David Simmons
*Attorney, Agent, or Firm*—Evelyn M. Sommer

[57] ABSTRACT

A friction brake and safety slip clutch is positioned between a gumbox and a hand operated pinion shaft used to raise and lower the gumbox into contact with sealant transfer rollers of an apparatus for applying sealant material to envelopes. The brake and clutch prevents the gumbox from falling from a raised elevation during rotation of the pinion shaft or after the elevation has been attained.

8 Claims, 2 Drawing Figures

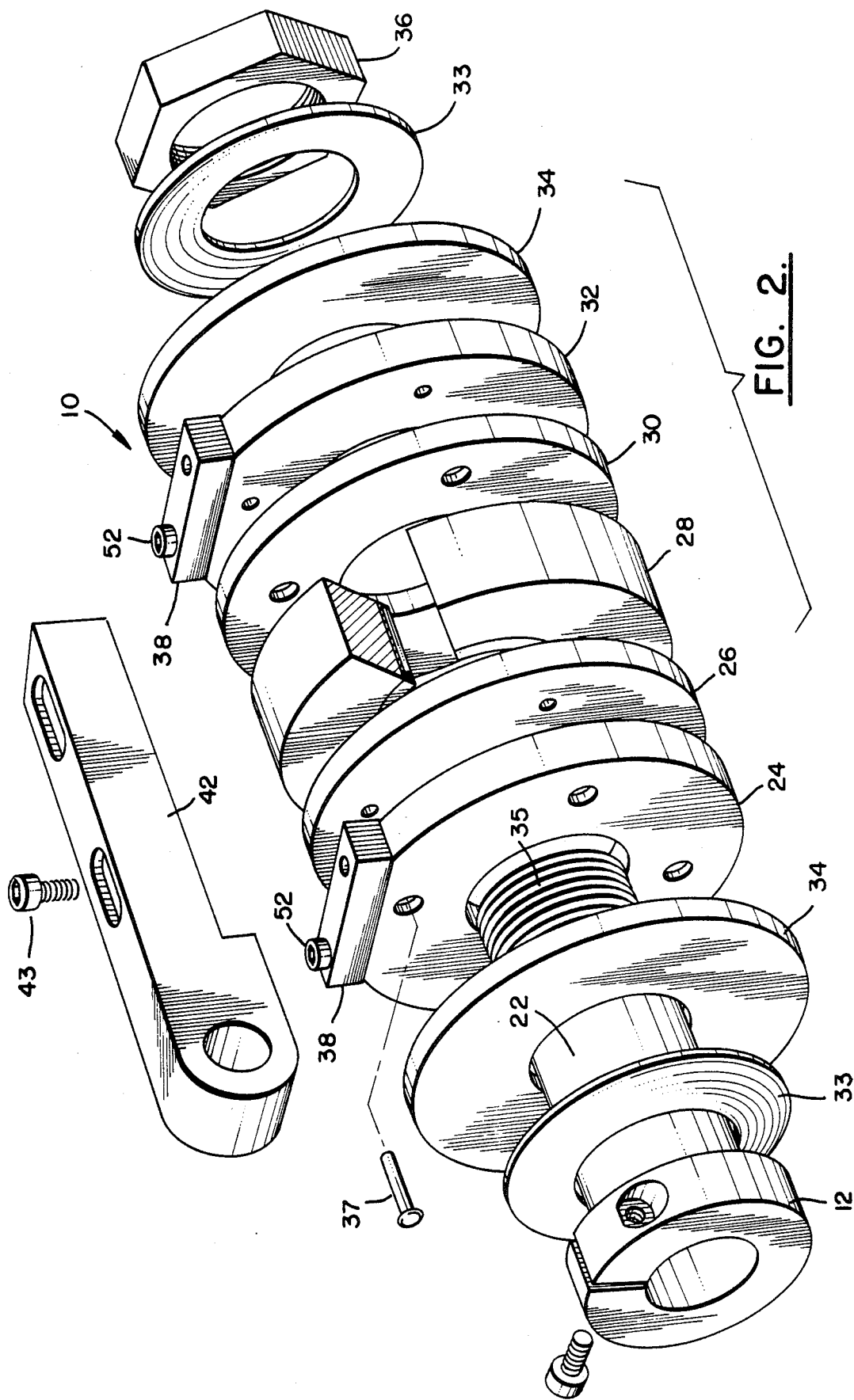

ENVELOPE GUMBOX FRICTION BRAKE AND SAFETY SLIP CLUTCH

BACKGROUND OF THE INVENTION

1. Field of the Invention

This invention relates to a mechanism used to hold a gumbox on an envelope machine steady as it is being raised and lowered to a position for contact with gum applying rollers for transferring gum or latex sealing material from the gumbox to an envelope and more particularly, a mechanism comprising a friction brake and safety slip clutch disposed between a manual hand crank pinion used to raise and lower the gumbox and the gumbox.

2. Description of the Prior Art

Apparatus for applying sealing material to envelopes generally consists of a conveyor which takes a folded envelope from a hopper or an unfolded blank from the hopper which is then folded, and successively feeds the folded envelope past a latex sealing material applicator which applies the latex sealing material to spaced portions of the envelope which would normally be sealed after insertion of the contents, and then drying apparatus where the wet latex is dried but can be remoistened for sealing purposes. The envelopes are then removed from the conveyor and stacked. An example of such an apparatus is shown in U.S. Pat. No. 3,965,851, assigned to the same assignee as the instant invention.

The latex applicator is placed in contact with one or more gumboxes. The gumboxes are raised or lowered into contact with the applicator, which usually includes at least one latex transfer roller. The latex transfer roller rotates through the gumbox and transfers latex sealing material to an applicator contact roll whose nip is tangent to and opposite an impression roll. The applicator contact roll can be provided with a suitable latex applying pattern and the folded envelopes are held on the conveyor and sent between the nip of the impression and applicator contact roll wherein latex is transferred from the applicator contact roll to the envelope in the predisposed pattern, and then the envelope is conveyed to a suitable oven to dry the latex sealing material.

The gumboxes are raised or lowered relative to the latex transfer roller manually for cleaning by rotating a hand crank which drives a pinion whose shaft is connected to the gumbox in such a manner that rotation of the pinion is translated into motion which would raise and lower the gumboxes. However, if there is slippage between the hand crank and pinion or the operator's hand is wet so that it slips on the crank, the gumbox can fall or reverse movement spilling its contents and possibly causing injury to the operator.

Accordingly, this invention relates to a friction brake and safety slip clutch device adapted to be positioned between the driven pinion shaft and gumboxes to substantially preclude movement of the gumboxes once rotation of the hand crank driving the pinion has ceased and to further preclude the weight of the gumboxes and sealant material disposed therein from lowering the gumboxes out of position with the gum transfer rollers once a proper elevation for the gumboxes has been attained.

SUMMARY OF THE INVENTION

In accordance with this invention, the friction brake and safety slip clutch includes a split ring or collet fixed to a pinion shaft having a pinion at one end in meshing engagement with a gear provided with a hand crank. Rotation of the hand crank will rotate the pinion and pinion shaft and collet fixed to the shaft. The collet has an elongated stem extending from one surface on which are positioned in succession, a first thrust ring, a first friction disk secured to a pad of friction material, a clutch disk, a second pad of friction material secured to a second friction disk, a thrust ring, and a nut which is threaded on the sleeve to clamp the pads of friction material and their mounting friction disks between the thrust rings and clutch disk. The clamping relation is maintained by a pair of oppositely oriented concave-convex spring washers. The clutch disk has an inner bore press-fitted with the outer race of a uni-directional needle or roller bearing between the collet stem and disk, so that it turns with the pinion shaft in one direction only, for example in the direction of rotation raising or lowering the gumbox. A substantially rectangular mount is fixed to a flat provided on the outer diameter of each friction disk. A horizontal lock arm is carried by each mount and connected to a frame pivotally mounting one or more of the envelope gumboxes.

Rotation of the crank in one direction, e.g., clockwise, will cause rotation of the pinion and pinion shaft in an opposite direction, e.g., counterclockwise to rotate the collet stem, unidirectional bearing, and clutch disk, friction pads and disks and lock arm fixed to the frame, which in turn will be rotated through an arc to raise or lower the gumboxes for cleaning. The gumboxes are normally maintained in an horizontal position during movement of the frame by being pivoted to the frame.

The gumboxes and frame are cantilevered from the lock arm and pinion shaft which tends to rotate the gumbox frame and gumboxes about the shaft. This is precluded by contact of the friction pads on the friction disks mounting the lock arm and gumboxes with the opposite surfaces of the clutch disk which serves as a brake to preclude rotation of the friction disks.

Further, in the event of slippage between the crank gear and pinion or upon slippage of the hand on the hand crank wherein the pinion shaft may be rotated in direction opposite to that desired, e.g., clockwise, the lock arm and friction disks will remain substantially stationary as the tendency of the split ring collet and friction disks to rotate in a clockwise direction will be abated by the friction pads on the friction disks making braking contact under the weight of the cantilevered gumboxes with the opposed surfaces of the clutch disk holding the lock arm which is connected to the gumbox frame, as the pinion shaft and collet stem slips or rotates relative to the clutch disk in the clockwise direction tending to raise or lower the gumbox frame, because of the unidirectional bearing between the clutch disk and collet stem which permits relative rotation in the clockwise direction. This precludes undue rotation of the gumbox mounting frame and possible injury to the machine operator.

To reverse movement of the gumboxes, positive rotation of the pinion shaft in a clockwise direction by the continuous and sustained rotation of the hand crank in a counterclockwise direction will cause rotation of the friction disks and clutch disk to lower or raise the gumbox or gumboxes because of the clamped relation of the friction disks to the thrust rings which in turn are clamped to the collet fixed to the pinion shaft by the nut threaded on the end of the collet stem. Sustained rotation of the friction disks and pads will rotate the clutch disk through the frictional contact of the pads with the opposite surfaces of the clutch disk.

BRIEF DESCRIPTION OF THE DRAWINGS

Further objects and advantages of the present invention will become more apparent from the following description and claims, and from the accompanying drawings, wherein:

FIG. 2 is an exploded perspective view of the envelope gumbox friction brake and safety slip clutch of the present invention illustrated in FIG. 1.

DETAILED DESCRIPTION OF THE PREFERRED EMBODIMENT

Figure 1:
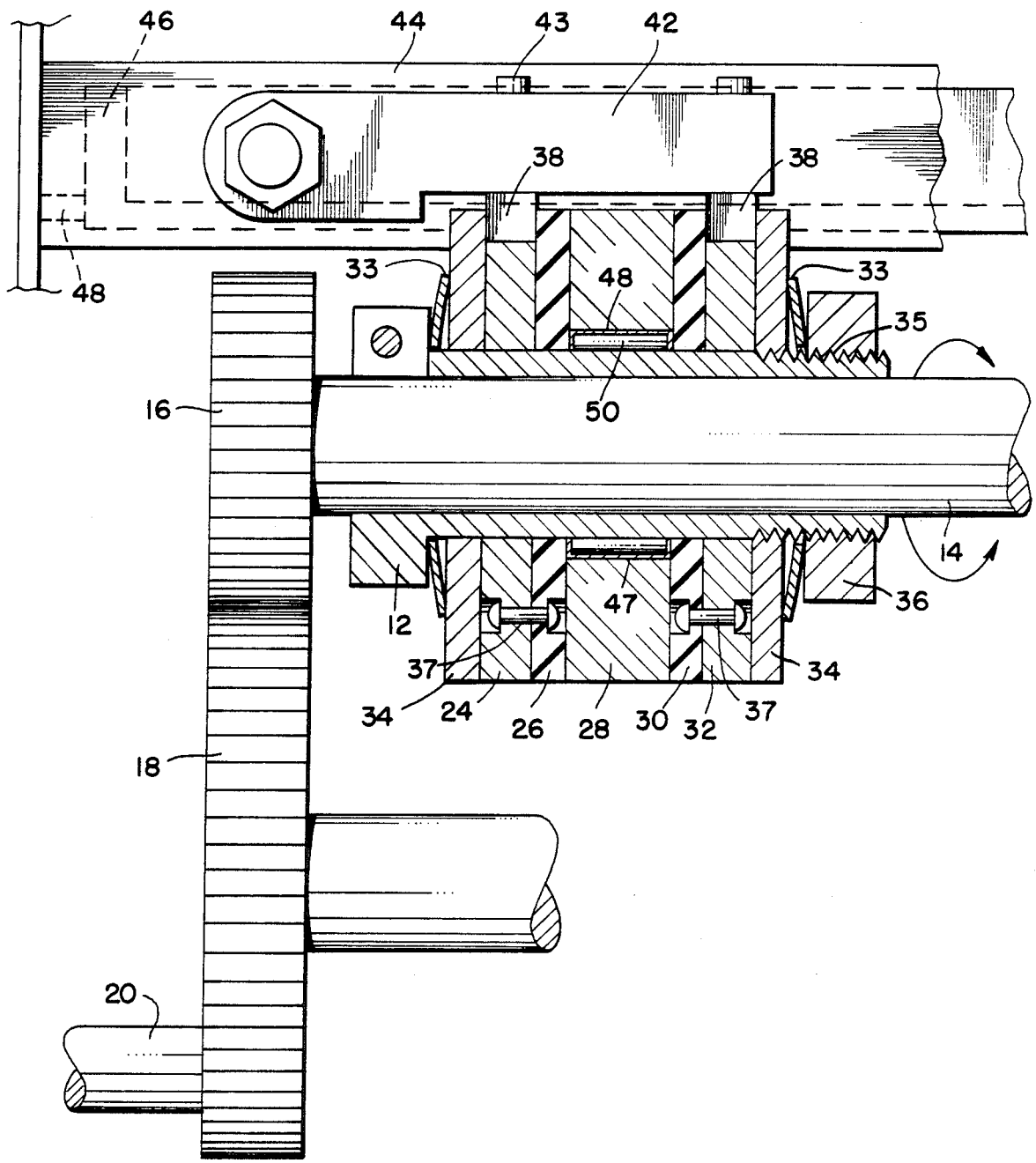
FIG. 1 is a longitudinal cross-sectional view of the friction brake and safety slip clutch of the present invention mounted on a pinion shaft which is used to raise and lower an envelope gumbox frame mounting one or more gumboxes.

Referring now to the drawing in detail, wherein like numerals indicate like elements throughout the several views, the friction brake and safety slip clutch 10 of the present invention includes a split ring or collet 12 fixed to a pinion shaft 14 having a pinion 16 at one end in meshing engagement with a gear 18 provided with a hand crank 20. Rotation of the hand crank 20 will rotate the pinion 16 and pinion shaft 14 and collet 12 fixed to the shaft.

The collet 14 has an elongated hollow stem or sleeve 22 extending from its rear surface on which are positioned in succession, a concave-convex spring washer 33, a thrust ring 34, a first friction disk 24 secured by rivets 37 to a pad of friction material 26, a clutch disk 28, a second pad of abrasive friction material 30 secured by rivets 37 to a second friction disk 32, a second thrust ring 34, a second concave-convex spring washer 33, and a nut 36 which is threaded on the threads 35 on sleeve 22 to clamp the pads of friction material 26, 30 and their mounting friction disks 24, 32 between the thrust rings and to the rear surface of collet 12 by transmitting axial pressure through the washers 33 and thrust rings 34 against the rear surface of the collet 12. The clutch disk 28 has an inner bore 47 press-fitted with the outer race 48 of a unidirectional needle or roller bearing 50 between the collet stem 22 and clutch disk 28, so that the pinion shaft 14 turns the clutch disk in one direction only, for example, in the direction of rotation lowering the gumbox.

A substantially rectangular mount 38 is fixed by a threaded fastener 52 to a flat 40 provided on the outer diameter of each friction disk 24, 32. A horizontal lock arm 42 is fixed to each mount by a threaded fastener 43 and connected to a frame 44 pivotally mounting one or more envelope gumboxes 46.

Rotation of the crank 20 in one direction, e.g. clockwise, will cause rotation of the pinion 16 and pinion shaft 14 in an opposite direction e.g., counterclockwise, to rotate the collet stem 22, unidirectional bearing 50 and clutch disk 28, friction pads 26, 30 and friction disks 24, 32, and lock arm 42 fixed to the frame 44 which in turn will be rotated through an arc to lower the gumbox for cleaning. The gumboxes 46 are normally maintained in a horizontal position during movement of the frame 44 by being pivoted to the frame 44 by pintles 48.

The frame 44 and gumboxes 46 are cantilevered from the lock arm 42 and pinion shaft 14 which tends to rotate the gumbox frame 44 and gumboxes 46 about the shaft 14. This is precluded by contact of the friction pad on each of the friction disks 24, 32 mounting the lock arm 42 and gumboxes 46 with the opposite surfaces of the clutch disk 28 which serves as a brake to preclude rotation of the friction disks.

Further, in the event of slippage between the crank gear 18 and pinion 16 or upon slippage of the hand on the hand crank 20 wherein the pinion shaft 14 may be rotated in direction opposite to that desired e.g., clockwise, the lock arm 42 and friction disks 24, 32 will remain substantially stationary as the tendency of the split ring collet 12 and friction disks to rotate in a clockwise direction will be abated by the friction pads 26, 30 on the friction disks making braking contact under the weight of the cantilever gumboxes 46 with the opposed surfaces of the clutch disk holding the lock arm 42 which is connected to the gumbox frame, as the pinion shaft 14 and collet sleeve 22 can slip or rotate relative to the clutch disk 28 in the clockwise direction tending to raise the gumbox frame 44 because of the unidirectional bearing 50 between the clutch disk 28 and collet stem 22 which permits relative rotation in the clockwise direction. This precludes undue rotation of the gumbox mounting frame 44, and possible injury to the machine operator.

To reverse movement of the gumboxes 46, positive rotation of the pinion shaft 14 in a clockwise direction by the continuous and sustained rotation of the hand crank 20 in a counterclockwise direction will cause rotation of the friction disks 24, 32 and clutch disk 28 to e.g., raise the gumbox or gumboxes 46 because of the clamped relation of the friction disks to the collet 12 fixed to the pinion shaft 14. Sustained rotation of the friction disks 24, 32 and attached pads will rotate the clutch disk 28 through the frictional contact of the pads with the opposite surfaces of the clutch disk.

What is claimed as new is as follows:

1. In an apparatus for applying sealant material to an envelope, said sealant material being disposed in a gumbox, the improvement comprising:

means for raising and lowering said gumbox to a position wherein the sealant material disposed within said gumbox can be disposed on a gum transfer roller, said means including a rotatable shaft, drive means on one end of said shaft for rotating said shaft, means between said shaft and gumbox for raising and lowering said gumbox in response to rotation of said shaft, said means including a friction brake for preventing substantial rotation of said shaft in response to cessation of said drive means for rotating said shaft.

2. The apparatus of claim 1 wherein said friction brake includes a collet adapted to be secured to said shaft, said collet including a tubular stem, at least one annular friction disk mounted on said collet stem, at least one pad of abrasive material connected to a surface of said friction disk mounted on said collet stem, and a uni-directional clutch disk mounted on said collet stem having a surface in contact with a surface of said pad of abrasive material, means threadedly received on said stem for clamping said friction disk and friction pad, and said clutch disk to said collet, and means between said friction disk and gumbox for securing said friction disk to said gumbox.

3. The apparatus of claim 2 wherein said securing means includes
a mount on said friction disk and
a lock arm secured to said mount.

4. The apparatus of claim 3 wherein said friction disk includes a flat on which said mount is secured.

5. The apparatus of claim 1 wherein said friction brake includes
a collet adapted to be secured to said shaft, said collet including
a tubular stem,
a first and second annular friction disk mounted on said collet stem,
a first and second pad of abrasive material mounted on said collet stem connected to a surface of said first and second annular friction disks, respectively, and
a uni-directional clutch disk,
means mounting said clutch disk on said collet stem with a surface in contact with a surface of each of said pads of abrasive material, said mounting means being adapted to rotate with said collet stem in one direction but not in an opposite direction,
means threadedly received on said stem for clamping said friction disks and friction pads, and said clutch disk to said collet, and
means between each of said friction disks and gumbox for securing said friction disks to said gumbox.

6. The apparatus of claim 5 wherein said mounting means includes a unidirectional bearing between said clutch disk and collet stem.

7. The apparatus of claim 6 wherein said securing means includes
a mount on each of said friction disks, and
a lock arm secured to said mount.

8. The apparatus of claim 7 wherein each of said friction disks includes a flat on which a mount is secured.

* * * * *